(12) United States Patent
Solomon

(10) Patent No.: US 9,344,540 B2
(45) Date of Patent: May 17, 2016

(54) INTEGRATED MOBILE PHONE CASE AND LIGHTER COMPARTMENT

(71) Applicant: Shahar Solomon, Las Vegas, NV (US)

(72) Inventor: Shahar Solomon, Las Vegas, NV (US)

(*) Notice: Subject to any disclaimer, the term of this patent is extended or adjusted under 35 U.S.C. 154(b) by 28 days.

(21) Appl. No.: 14/221,340

(22) Filed: Mar. 21, 2014

(65) Prior Publication Data

US 2015/0271306 A1    Sep. 24, 2015

(51) Int. Cl.
*H04M 1/00* (2006.01)
*H04M 1/21* (2006.01)
*H04M 1/18* (2006.01)

(52) U.S. Cl.
CPC ............. *H04M 1/21* (2013.01); *H04M 1/185* (2013.01)

(58) Field of Classification Search
CPC ... H04M 1/026; H04M 1/0283; H04B 1/3888
USPC .......................................... 455/575.1, 575.8
See application file for complete search history.

(56) References Cited

U.S. PATENT DOCUMENTS

| 7,160,104 | B2 | 1/2007 | Faber |
| 7,373,183 | B2 | 5/2008 | Brudos |
| 7,643,855 | B2 | 1/2010 | Iwama |
| 8,504,127 | B2 | 8/2013 | Altschul |
| 2008/0020794 | A1 | 1/2008 | Garon |
| 2008/0053803 | A1 | 3/2008 | Hammermayer |
| 2010/0291497 | A1 | 11/2010 | Lee |
| 2011/0261026 | A1 | 10/2011 | Kim |
| 2012/0244918 | A1 | 9/2012 | Hall |
| 2013/0220847 | A1* | 8/2013 | Fisher et al. ............... 206/216 |

FOREIGN PATENT DOCUMENTS

| EP | 1484901 | 12/2004 |
| EP | 1887765 | 2/2008 |
| WO | 2005/043040 | 5/2005 |
| WO | 2006/042878 | 4/2006 |

* cited by examiner

*Primary Examiner* — Ayodeji Ayotunde
(74) *Attorney, Agent, or Firm* — The Keys Law Firm PLLC

(57) ABSTRACT

An integrated cell phone case and lighter comprises a phone casing, a bottom backing and a removable lighter and is sized and shaped to be placed on over a conventional cell phone in a manner such that it substantially covers the cell phone on all sides except for the side with the touch screen. The phone casing is a viscoelastic body that includes a phone holding level for holding a cell phone and a lighter holding level adapted to enable a lighter to be stored in a the lighter holding compartment thereon. The bottom backing is a rigid shell which is sized to fit over the combined cell phone and phone casing assembly. The removable lighter is defined by a battery operated, butane refillable lighter in a modified rectangular exterior that includes side recesses and a finger gripping.

7 Claims, 2 Drawing Sheets

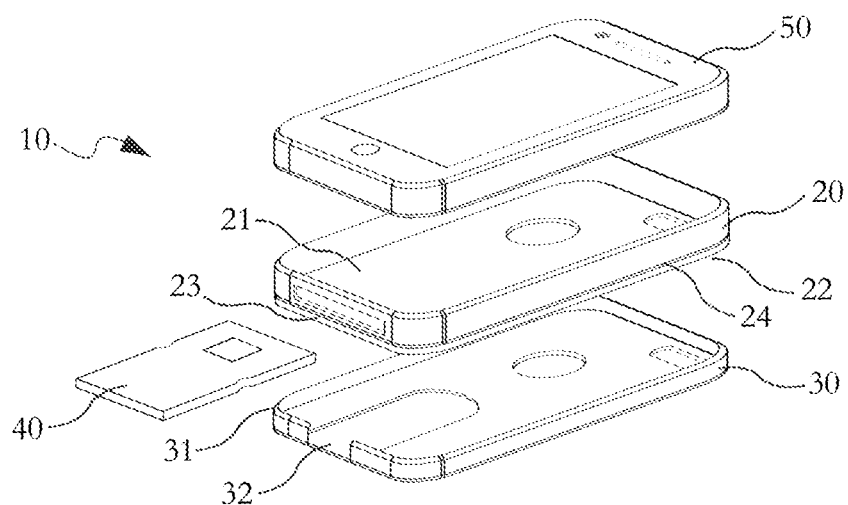
Fig. 1
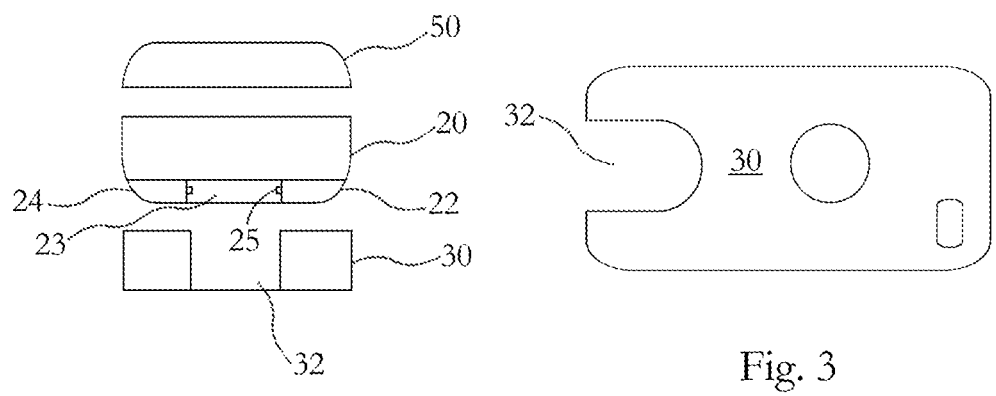
Fig. 2
Fig. 3

INTEGRATED MOBILE PHONE CASE AND LIGHTER COMPARTMENT

BACKGROUND OF THE INVENTION

1. Field of the Invention

This invention relates generally to cell phone accessories and, more particularly, to a protective case for a cell phone which includes a compartment for a removable lighter.

2. Description of the Prior Art

The use of mobile communication devices (or mobile devices), such as PDAs, cell phones (or smart phones, or mobile phones), and tablet computers, is well known. It is understood that such devices are typically fragile and subject to breaking when dropped. Consequently, protective cases are typically used with cell phones and other mobile communication device in order to provide a covering which enhances the durability of such devices.

It is common for individuals to carry certain indispensible items with them at all times. One such item is often a cell phone. Others may include a lighter and a writing utensil such as a pen. A problem which still exists, however, is that carrying so many individual items separately can lead to forgetting or losing such items and is generally inconvenient to do. If a plurality of such indispensible items could be combined into one integrated structure, they would be less likely to become lost or separate and a user would not be required to devote as much pocket or bag space to them. Thus, there remains a need for an integrated cell phone case and lighter which would enable a user to store a removable lighter in his cell phone case. It would be helpful if such an integrated cell phone case and lighter and included lighter were structured to resist the lighter inadvertently falling out of the case. It would be additionally desirable for such an integrated cell phone case and lighter to include compartments for such removable items while not substantially effecting the ability of the cell phone case to protect a contained cell phone.

The Applicant's invention described herein provides for a cell phone case which includes a removable lighter and pen in built in compartments. The primary components in Applicant's integrated cell phone case and lighter are a modified cell phone case, a removable lighter, and a removable pen. When in operation, the integrated cell phone case and lighter enables a plurality of discrete indispensible items to be transported in one structure. As a result, many of the limitations imposed by prior art structures are removed.

SUMMARY OF THE INVENTION

An integrated cell phone case and lighter for transporting and storing a commonly carried item, such as a light in a built in compartment. The integrated cell phone case and lighter comprises a phone casing, a bottom backing and a removable lighter and is sized and shaped to be placed on over a conventional cell phone in a manner such that it substantially covers the cell phone on all sides except for the side with the touch screen. The phone casing is a viscoelastic body that includes a phone holding level for holding a cell phone and a lighter holding level adapted to enable a lighter to be stored in a the lighter holding compartment thereon. The bottom backing is a rigid shell which is sized to fit over the combined cell phone and phone casing assembly. The removable lighter is defined by a battery operated, butane refillable lighter in a modified rectangular exterior that includes side recesses and a finger gripping.

It is an object of this invention to provide an integrated cell phone case and lighter which would enable a user to store a removable lighter in his cell phone case.

It is another object of this invention to provide an integrated cell phone case and lighter and included lighter structured to resist the lighter inadvertently falling out of the case.

It is yet another object of this invention to provide an integrated cell phone case and lighter including compartments for such removable items while not substantially effecting the ability of the cell phone case to protect a contained cell phone.

These and other objects will be apparent to one of skill in the art.

BRIEF DESCRIPTION OF THE DRAWINGS

FIG. 1 is an exploded side perspective view of an integrated cell phone case and lighter built in accordance with the present invention along with a conventional cell phone.

FIG. 2 is an exploded side elevational view of an integrated cell phone case and lighter built in accordance with the present invention along with a conventional cell phone.

FIG. 3 is a bottom plan view of the bottom backing of an integrated cell phone case and lighter built in accordance with the present invention.

DETAILED DESCRIPTION OF THE INVENTION

Figure 4:
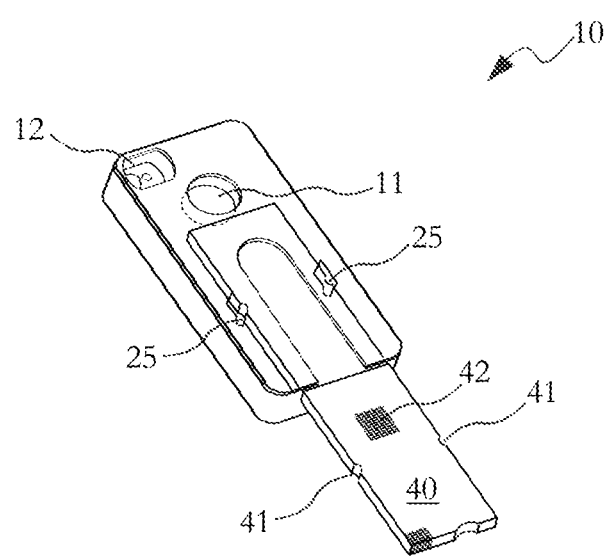
FIG. 4 is a side perspective view of an integrated cell phone case and lighter built in accordance with the present invention along with a conventional cell phone with the lighter compartment in shadow.

Referring now to the drawings and in particular FIGS. 1-4, an integrated cell phone case and lighter 10 is shown having a phone casing 20, a bottom backing 30 and a removable lighter 40. The integrated cell phone case and lighter 10 is sized and shaped to be placed on a conventional cell phone 50 in a manner such that it substantially covers each side of the cell phone 14 except the side with the touch screen.

The phone casing 20 is a viscoelastic body that includes a phone holding level 21 and a lighter holding level 22. The viscoelastic property enables the phone casing 20 to stretch over the cell phone 50 and for ridges 31 on the bottom backing 30 to be slid over the phone casing 20. In the preferred embodiment it is constructed of rubber. The phone holding level 21 is defined by a basin sized and shaped to contain the cell phone 50. The lighter holding level 22 is disposed underneath the phone holding level 21 and includes a hollow lighter holding compartment 23 and a structural support 24. The lighter holding compartment 23 provides a cavity in which the lighter 40 can be inserted and held in place. As it is understood that the space required to hold the cell phone 50 is substantially greater than the size of the cavity of the lighter holding compartment 23, the remaining area of the lighter holding level 22 is defined by a enclosed pocket having the same depth as the lighter holding compartment 23 so that the bottom surface of the lighter holding level 22 as a whole has the same planar dimensions as the phone holding level 21.

The inside the cavity which defines the lighter holding compartment 23 includes a pair of spring loaded retaining tabs 25. The spring loaded quality of the retaining tabs 25 enable the retaining tabs 25 to retract into side wall of the lighter holding compartment 23 when pressed against and return to the extended position shown in FIG. 2 when the pressure against them is removed. The retaining tabs 25 are arranged on each side of the lighter holding compartment 23 and retract into the side wall of the lighter holding compartment 23 when a lighter 40 is inserted into the lighter holding compartment 23, with the body of the lighter 40 maintaining the requisite pressure on the retaining tabs 25. Once the lighter 40 is in fully place in the lighter holding compartment 23 and the side recesses 41 aligned with the retaining tabs 25 and the pressure holding the retaining tabs 25 into the side wall of the lighter holding compartment 23 is removed. Once that pressure is removed, the retaining tabs 25 extend back to their extended position, shown in FIG. 2, and the retaining tab 25 on each side engages the side recess 41 on each side of the lighter 40, securing the lighter 40 in place. The lighter 40 is removed in the reverse manner, with a user utilizing the finger gripping surface 42 to pull the lighter 40 out of the lighter holding compartment 23, with the retaining tabs 25 first being dislodged from the side recesses 41 and then the lighter 40 being slide out. It is understood that the retaining tabs 25 are curved and the side recesses 41 are inverted curves so that together they can resist inadvertent movement when engaged but enable the retaining tabs 25 to be dislodged from the side recesses 41 when manual force pulling the lighter 40 out of the lighter holding compartment 23 is applied.

The bottom backing 30 is a rigid shell which is sized to fit over the combined cell phone 50 and phone casing 20 assembly. Once the phone casing 20 is placed over the cell phone 50, the bottom backing 30 is snapped thereon. The rigid nature of the bottom backing 30 along with the presence of a top ridge 31 which extends horizontally and is disposed along the upper edge of the side wall of the bottom backing 30, enable it to attach to the cell phone 50 and phone casing 20 assembly and hold the three components together. The bottom backing 30 additionally includes a handling recess 32 which provides access to the back of a lighter 40 disposed in the lighter holding compartment 23 of a phone casing 20 that the bottom backing 30 has been inserted over.

The exterior of the lighter 40 includes the side recesses 41 and the finger gripping surface 42. The finger gripping surface 42 is defined as a grainy surface that, in contrast to the substantially smooth surface of lighter 40, assists in allowing a user to grip the lighter 40 to pull it out or push it in to the lighter holding compartment 23. In the preferred embodiment, the lighter 40 is a battery operated, butane refillable lighter.

The integrated cell phone case and lighter 10 includes spaces for the accessories of the cell phone 50 that it is to be placed on, including a space for a speaker 11 and a camera 12. As such, when in place over a cell phone 50, the features of the cell phone 50 which utilize those features are still able to be utilized.

In an alternate embodiment, the integrated cell phone case and lighter is constructed with a pen holding compartment in place of the lighter holding compartment and a removable pen is provided in place of the lighter. In such an embodiment, the construction of the integrated cell phone case and lighter is substantially the same except that the pen holding compartment, handling recess and pen body are narrower than the lighter holding compartment, handling recess and lighter, respectively.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A modified cell phone case, comprising:
   a discrete phone casing constructed of a viscoelastic material and defined by a phone holding level and a lighter holding level, wherein phone casing has a planar bottom side, said phone holding level is defined by a basin in which a conventional cell phone can be inserted, and said lighter holding level is disposed beneath the phone holding level and includes a lighter holding compartment and a structural support which together create a planar bottom surface which defines the bottom side;
   a discrete bottom backing constructed of a rigid material and configured to be placed over said phone casing when the phone casing has a conventional cell phone inserted therein, wherein said bottom backing includes a handling recess which, when the bottom backing is in place over said phone casing, is aligned with lighter holding compartment such that the lighter holding compartment is not obstructed by the bottom backing; and
   a removable lighter adapted to fit in the lighter holding compartment and, when the bottom backing is in place over said phone casing, to pass through the handling recess.

2. The modified cell phone case of claim 1, wherein said removable lighter is a battery operated, butane refillable lighter.

3. The modified cell phone case of claim 1, wherein said removable lighter includes a finger gripping surface on its exterior surface.

4. The modified cell phone case of claim 1, wherein said lighter holding compartment includes at least one spring loaded retaining tab.

5. The modified cell phone case of claim 4, wherein:
   said removable lighter includes at least one side recess; and
   said retaining tab and side recess are adapted to engage each other when the removable lighter is disposed fully in the lighter holding compartment in a manner which enable the removable lighter to resist inadvertently sliding out of the lighter holding compartment.

6. The modified cell phone case of claim 1, wherein the bottom backing includes a top ridge which extends horizontally and is disposed along the upper edge of the side wall of the bottom backing, enabling the bottom backing when placed over the phone casing having a conventional cell phone therein to hold together the bottom backing, phone casing and cell phone assembly.

7. The modified cell phone case of claim 1, wherein said structural support defines an enclosed pocket having the same depth as the lighter holding compartment, thereby enabling the structural support to form the planar bottom surface with the lighter holding compartment.

* * * * *